United States Patent
Gysling et al.

(10) Patent No.: US 11,841,257 B2
(45) Date of Patent: Dec. 12, 2023

(54) METHOD AND APPARATUS FOR MEASURING WET GAS UTILIZING AN AUGMENTED CORIOLIS FLOW METER

(71) Applicant: Expro Meters, Inc., Wallingford, CT (US)

(72) Inventors: Daniel L Gysling, South Glastonbury, CT (US); Gabriel Dragnea, Denver, CO (US)

(73) Assignee: EXPRO METERS, INC., Wallingford, CT (US)

( * ) Notice: Subject to any disclaimer, the term of this patent is extended or adjusted under 35 U.S.C. 154(b) by 95 days.

(21) Appl. No.: 17/462,706

(22) Filed: Aug. 31, 2021

(65) Prior Publication Data

US 2022/0128390 A1 Apr. 28, 2022

Related U.S. Application Data (60) Provisional application No. 63/106,151, filed on Oct. 27, 2020.

(51) Int. Cl.
  *G01F 1/74* (2006.01)
  *G01F 1/36* (2006.01)
  *G01F 1/66* (2022.01)

(52) U.S. Cl.
  CPC .......... *G01F 1/74* (2013.01); *G01F 1/36* (2013.01); *G01F 1/666* (2013.01)

(58) Field of Classification Search
  CPC ... G01F 1/74; G01F 1/36; G01F 1/666; G01F 1/34; G01F 1/66; G01F 15/028; G01F 1/84

See application file for complete search history.

(56) References Cited

U.S. PATENT DOCUMENTS

| | | | |
|---|---|---|---|
| 7,152,460 B2 * | 12/2006 | Gysling | G01F 15/024 73/32 A |
| 7,389,187 B2 | 6/2008 | Kersey | |
| 7,418,877 B2 | 9/2008 | Gysling | |
| 7,603,916 B2 | 10/2009 | Gysling | |
| 7,793,555 B2 | 9/2010 | Gysling | |
| 9,068,872 B2 | 6/2015 | Gysling | |
| 9,091,581 B2 | 7/2015 | Henry | |
| 2008/0208483 A1 * | 8/2008 | Loose | G01N 29/024 702/22 |
| 2021/0010841 A1 | 1/2021 | Gandarillas | |

OTHER PUBLICATIONS

PCT Search Report for PCT/US21/48435 dated Dec. 20, 2021.

* cited by examiner

*Primary Examiner* — Peter J Macchiarolo
*Assistant Examiner* — John M Royston
(74) *Attorney, Agent, or Firm* — GETZ BALICH LLC (57) ABSTRACT

An apparatus and method for measuring wet gas using a Coriolis flow meter is provided. An apparatus embodiment includes a Coriolis meter, a DP meter, and a processing unit. The processing unit is in communication with the Coriolis and DP meters, and a memory storing instructions. The executed instructions cause the processing unit to: a) measure a density of the fluid flow using the Coriolis meter; b) determine a measure of gas wetness of the fluid flow using the measured density, an expected gas density value, and an equation of state model; c) determine a differential pressure measurement across the Coriolis meter; d) determine an over-reading of the differential pressure measurement; e) determine a mass flow rate of gas using the determined over-reading; and f) determine a mass flow rate of liquid.

15 Claims, 8 Drawing Sheets

METHOD AND APPARATUS FOR MEASURING WET GAS UTILIZING AN AUGMENTED CORIOLIS FLOW METER

This application claims priority to U.S. Patent Appln. No. 63/106,151 filed Oct. 27, 2020, which is hereby incorporated herein by reference in its entirety.

BACKGROUND OF THE INVENTION

1. Technical Field

The present disclosure relates to fluid flow metering devices and systems in general, and to fluid flow meter devices and systems that include a Coriolis type flow metering device in particular.

2. Background Information

Coriolis flow meters are widely used for single-phase flow applications. However, it is well-known that multiphase flow conditions can impair the accuracy and operability of Coriolis flow meters.

Wet gas flows are typically defined as gas continuous flows with some amount of liquid present in the gas continuous flow. The oil and gas industry defines various types of wet gas based on the amount of liquid present. Dry gas flows are typically defined as gas continuous flows with inconsequential or no amount of liquid present in the gas continuous flow.

Coriolis flow meters measure and interpret the effects that a fluid, conveyed within vibrating flow tubes, has on the vibrational characteristics of the fluid-conveying flow tubes to determine the mass flow and density of the conveyed fluid. Accurate interpretation of the vibration characteristics in terms of the mass flow and density of the fluid is typically achieved utilizing calibration methods applicable to certain types of flows. The vast majority of Coriolis flow meters utilize calibration and interpretation techniques that are applicable to single phase flows in which the flow is essentially homogeneous and essentially incompressible. As such, most Coriolis flow meters can provide accurate measurement for flows with small levels of inhomogeneities and with small levels of compressibility.

Multiphase flows conditions typically introduce high levels of fluid inhomogeneity and increase the effect fluid compressibility, resulting in errors due to decoupling and compressibility. For bubbly flows, defined as liquid continuous mixtures with relatively small volume fractions of gas present (e.g., <10% gas void fraction) analytical models have been developed to quantify and mitigate these effects with some success. For example, Hemp presents a model that predicts the errors in mass flow and density that occur when a Coriolis flow meter that was calibrated on a single phase flow operates on a bubbly fluid.

Less progress has been made addressing the errors associated with applying Coriolis flow meters to wet gas flows. Unlike bubbly flows in which the continuous phase, i.e., the liquid, typically remains in contact with the vibrating flow tubes, wet gas flows typically have significant amount of the discontinuous phase in contact with the vibrating flow tubes. Also, the liquid phase is typically orders of magnitude denser than the gas phase, such that even if the liquid is a small fraction by volume of the wet gas flow, it can account for a significant amount mass flow of the wet gas.

What is needed is a method and/or apparatus that improves the accuracy of Coriolis flow meters on wet gas flows that fit within the physical footprint and electronic framework of currently available Coriolis flow meters.

SUMMARY

According to an aspect of the present disclosure, an apparatus is provided that includes a Coriolis flow meter, a differential pressure (DP) flow meter, and a processing unit. The Coriolis flow meter has one or more flow tubes and is configured to determine a density of a fluid flow passing through the one or more flow tubes. The DP flow meter is configured to produce a differential pressure value of the fluid flow passing through the one or more flow tubes. The processing unit is in communication with Coriolis flow meter and the DP flow meter, and a non-transitory memory storing instructions, which instructions when executed cause the processing unit to: a) measure a density of the fluid flow passing within the one or more fluid flow tubes of the Coriolis flow meter using the Coriolis flow meter; b) determine a measure of gas wetness of the fluid flow using the measured density of the fluid flow, an expected gas density value based on a measured pressure value of the fluid flow and/or a measured temperature value of the fluid flow, and an equation of state model; c) determine a differential pressure measurement across at least one of the one or more flow tubes of the Coriolis flow meter using the DP flow meter; d) determine an over-reading of the differential pressure measurement due to wetness using the determined differential pressure measurement; e) determine a mass flow rate of gas within the fluid flow using the over-reading of the differential pressure measurement; and f) determine a mass flow rate of liquid within the fluid flow using an estimate of the wetness and the measured mass flow rate of gas within the fluid flow.

In any of the aspects or embodiments described above and herein, the instructions when executed may cause the processing unit to determine a density of the liquid within the fluid flow using a mass flow measurement of the fluid flow determined using the Coriolis flow meter and a correlation that relates the mass flow measurement of the fluid flow determined using the Coriolis flow meter to a total mass flow value, to determine the density of the liquid within the fluid flow.

In any of the aspects or embodiments described above and herein, the instructions when executed may cause the processing unit to determine the density of the liquid within the fluid flow using a Lockhart-Martinelli value.

In any of the aspects or embodiments described above and herein, the instructions when executed may cause the processing unit to determine the density of the liquid within the fluid flow using a wetness sensitivity constant for the Coriolis flow meter.

According to another aspect of the present disclosure, a method of determining a mass flow rate of liquid within a fluid flow is provided. The method includes: a) using a Coriolis flow meter having one or more flow tubes to measure a density of a fluid flow passing within the one or more flow tubes; b) determining a measure of gas wetness of the fluid flow using the measured density of the fluid flow, an expected gas density value based on a measured pressure value of the fluid flow and/or a measured temperature value of the fluid flow, and an equation of state model; c) determining a differential pressure measurement across at least one of the one or more flow tubes of the Coriolis flow meter using a differential pressure (DP) flow meter; d) determining an over-reading of the differential pressure measurement due to wetness; e) determining a mass flow rate of gas within the fluid flow using the over-reading of the differential pressure measurement; and f) determining a mass flow rate of liquid within the fluid flow using an estimate of the wetness and the measured mass flow rate of gas within the fluid flow.

In any of the aspects or embodiments described above and herein, the method may further include determining a density of the liquid within the fluid flow using a mass flow measurement of the fluid flow determined using the Coriolis flow meter and a correlation that relates the mass flow measurement of the fluid flow determined using the Coriolis flow meter to a total mass flow value.

In any of the aspects or embodiments described above and herein, the step of determining the density of the liquid within the fluid flow may use a Lockhart-Martinelli value.

In any of the aspects or embodiments described above and herein, the step of determining the density of the liquid within the fluid flow may use a wetness sensitivity constant for the Coriolis flow meter.

According to another aspect of the present disclosure, an apparatus is provided that includes Coriolis flow meter, a SONAR flow meter, and a processing unit. The Coriolis flow meter has one or more flow tubes and is configured to determine a density of a fluid flow passing through the one or more flow tubes. The SONAR flow meter has an array of sensors disposed on at least one of the one or more flow tubes. The processing unit is in communication with Coriolis flow meter and the SONAR flow meter, and a non-transitory memory storing instructions, which instructions when executed cause the processing unit to: a) measure a density of the fluid flow passing within the one or more fluid flow tubes of the Coriolis flow meter using the Coriolis flow meter; b) determine a measure of gas wetness of the fluid flow using the measured density of the fluid flow, an expected gas density value based on a measured pressure value of the fluid flow and/or a measured temperature value of the fluid flow, and an equation of state model; c) determine a convective velocity measurement of the fluid flow using the SONAR flow meter; d) determine an over-reading of the convective velocity measurement due to wetness using the determined convective velocity measurement; e) determine a mass flow rate of gas within the fluid flow using the over-reading of the convective velocity measurement; and f) determine a mass flow rate of liquid within the fluid flow using an estimate of the wetness with the measured mass flow rate of gas within the fluid flow.

In any of the aspects or embodiments described above and herein, the instructions when executed may cause the processing unit to determine a velocity of the gas within the fluid flow using the determined convective velocity measurement and a SONAR gas calibration constant.

In any of the aspects or embodiments described above and herein, the determination of the velocity of the gas within the fluid flow may use a Lockhart-Martinelli value.

In any of the aspects or embodiments described above and herein, the determination of the velocity of the gas within the fluid flow may use a wetness sensitivity constant for the SONAR flow meter.

According to an aspect of the present disclosure, a method of determining a mass flow rate of liquid within a fluid flow is provided. The method includes: a) using a Coriolis flow meter having one or more flow tubes to measure a density of a fluid flow passing within the one or more flow tubes; b) determining a measure of gas wetness of the fluid flow using the measured density of the fluid flow, an expected gas density value based on a measured pressure value of the fluid flow and/or a measured temperature value of the fluid flow, and an equation of state model; c) determining a convective velocity measurement of the fluid flow using a SONAR flow meter; d) determining an over-reading of the convective velocity measurement due to wetness using the determined convective velocity measurement; e) determining a mass flow rate of gas within the fluid flow using the over-reading of the convective velocity measurement; and f) determining a mass flow rate of liquid within the fluid flow using an estimate of the wetness and the measured mass flow rate of gas within the fluid flow.

According to an aspect of the present disclosure, a Coriolis flow meter is provided that includes a pair of flow tubes, a differential pressure (DP) flow meter, an array of sensors, and a processing unit. The DP flow meter is configured to determine a measurement of differential pressure of fluid flow across at least one of the flow tubes. The array of sensors is installed on at least one of the flow tubes. The sensors are configured to determine a measurement of a convective velocity of the fluid flow passing through the respective at least one of the flow tubes. The processing unit is in communication with the DP flow meter and the array of sensors, and a non-transitory memory storing instructions, which instructions when executed cause the processing unit to use the measurement of differential pressure of fluid flow, the measurement of convective velocity, and at least one of a model of over-reading due to wetness of the differential pressure measurement or a model of over-reading due to wetness of the convective velocity measurement to determine at least one of a gas mass flow rate or a liquid mass flow rate through the Coriolis flow meter.

In any of the aspects or embodiments described above and herein, the DP flow meter may be configured to determine the measurement of differential pressure of fluid flow across at least one of the flow tubes.

In any of the aspects or embodiments described above and herein, the DP flow meter may be configured to determine the measurement of differential pressure of fluid flow in close communication with the Coriolis flow meter.

In any of the aspects or embodiments described above and herein, the instructions when executed may cause the processing unit to: a) determine a density of the fluid flow passing through the flow tubes; b) determine a presence of wetness in the fluid flow using the determined density of the fluid flow, and an expected gas density based on at least one of a measured pressure value of the fluid flow or a measured temperature value of the fluid flow and an equation of state model; and c) determine a gas flow rate of the fluid flow using the Coriolis flow meter or an interpretation of the measured convective velocity and the measured differential pressure measurement based on the determination of the presence of wetness in the fluid flow.

According to an aspect of the present disclosure, a Coriolis flow meter is provided that includes at least one flow tube, a drive coil, a pair of pickoff coils, an array of sensors, and a processing unit. The drive coil is operable to drive a vibratory structural mode of the at least one flow tube at resonance. The pair of pickoff coils is operable to sense the motion of the at least one flow tube. The array of sensors is disposed on the at least one flow tube. The processing unit is in communication with the drive coil, the pickoff coils, the array of sensors, and a non-transitory memory storing instructions, which instructions when executed cause the processing unit to: a) measure a density of a fluid flow passing through the at least one flow tube using input from the drive coil and the pickoff coils; b) determine a measure of gas wetness of the fluid flow using the measured density of the fluid flow, an expected gas density value based on a measured pressure value of the fluid flow and/or a measured temperature value of the fluid flow, and an equation of state model; c) determine a convective velocity measurement of the fluid flow using input from the array of sensors; d) determine an over-reading of the convective velocity measurement due to wetness using the determined convective velocity measurement; e) determine a mass flow rate of gas within the fluid flow using the over-reading of the convective velocity measurement; and f) determine a mass flow rate of liquid within the fluid flow using an estimate of the wetness with the measured mass flow rate of gas within the fluid flow.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DISCLOSURE OF THE INVENTION

Figure 1:
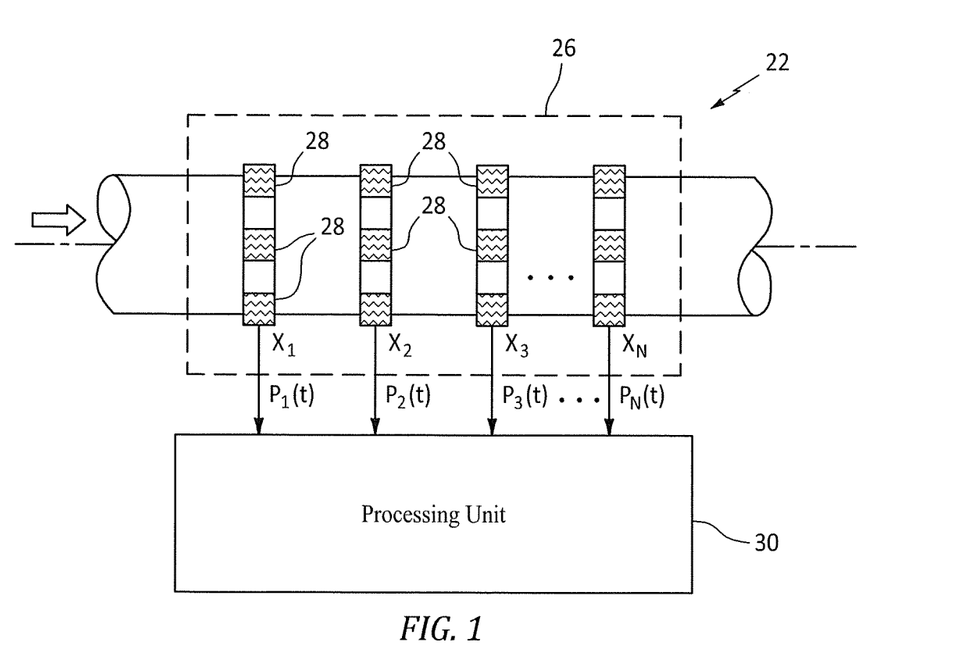
FIG. 1 is a diagrammatic illustration of a strain sensor array attached to a pipe with the array in communication with a strain sensor processing unit.
Figure 2:
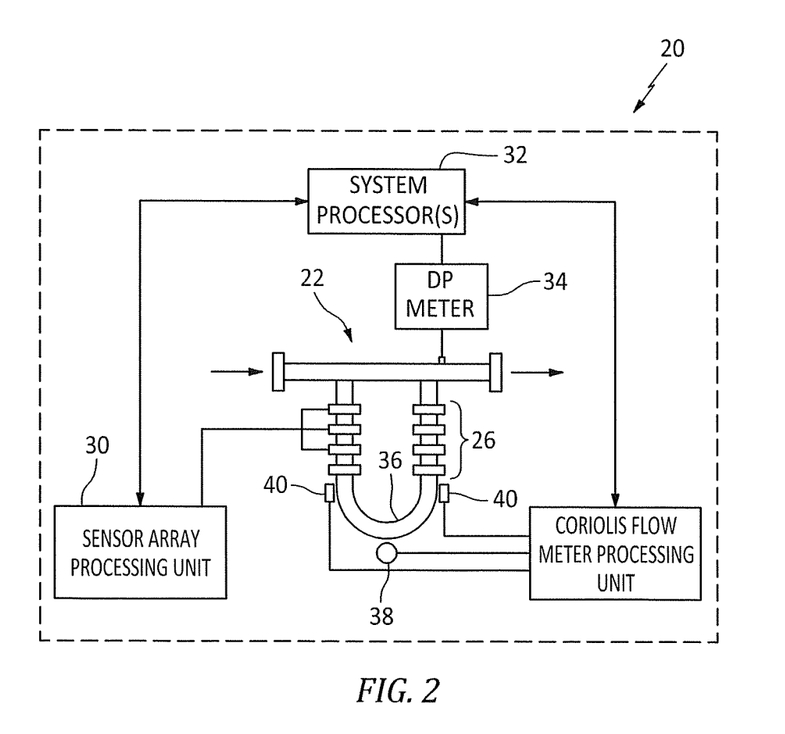
FIG. 2 is a diagrammatic representation of an exemplary embodiment of the present disclosure.
Figure 3:
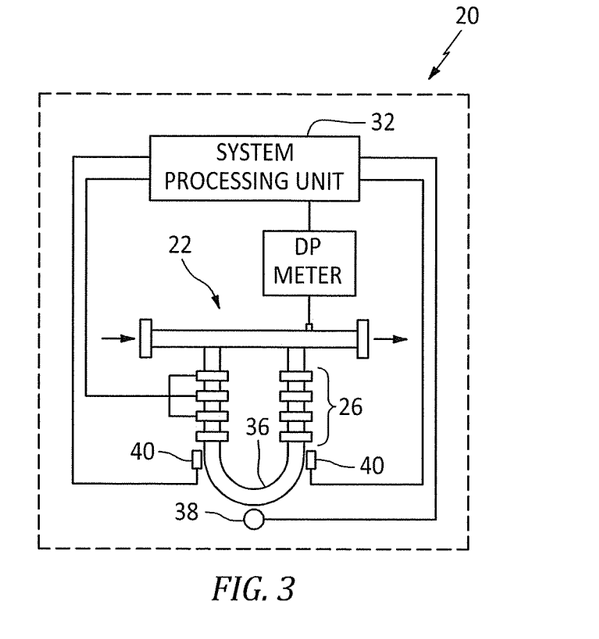
FIG. 3 is a diagrammatic representation of an exemplary embodiment of the present disclosure.

Referring to FIGS. 1-3, the present disclosure is directed to a system 20 and method for measuring one or more fluid parameters (e.g., wet gas, liquid flow rate, gas flow rate, etc.) of a fluid flow disposed within a flow meter having one or more vibratable tubes such as a Coriolis flow meter (referred to hereinafter as a "Coriolis flow meter" to facilitate the description herein. The system 20 includes a Coriolis flow meter 22, SONAR instrumentation, and a differential pressure flow meter ("DP meter 34").

The SONAR instrumentation utilized within the present disclosure includes an array 26 of strain sensors 28 and a sensor array processing unit 30 configured to determine a convective flow velocity and the like and is referred to herein as a "SONAR flow meter 24" (See FIG. 1). As will be described herein, the SONAR flow meter 24 may be an independent component within the present system 20 or the components of the SONAR flow meter 24 may be incorporated into the present disclosure system 20. For example, and as will be described herein, the sensor array processing unit 30 may be a separate component within the system 20, or the functionality of the sensor array processing unit 30 may be incorporated into a system processing unit 32. The strain sensors 28 within the array 26 are configurable to be applied to an exterior surface of a conduit (hereinafter referred to as a "flow tube") configured to contain a fluid for passage along an axial axis of the flow tube. The flow tube may comprise a metallic material. The flow tube is typically cylindrical, but the present disclosure is not limited to a cylindrical cross-section flow tube. The strain sensors 28 are configured to sense unsteady pressures (e.g., associated with acoustic signals) within the fluid flow by sensing strain within the wall of the flow tube. The present disclosure is not limited to any particular type of strain sensor 28. Non-limiting examples of acceptable strain sensors 28 include piezoelectric sensors such as, but not limited to macro fiber composite (MFC) type sensors, piezoelectric film (PVDF) type sensors, etc. The sensor array 26 includes at least two sensors 28 axially spaced apart from one another. In many applications, an array 26 of eight sensors 28 axially spaced apart from one another is useful but the array 26 may include more or fewer sensors 28. The sensor array 26 may have a single sensor at a given axial position ($X_1, X_2, X_3, \ldots X_N$) or it may include a plurality of sensors disposed at a given axial position; e.g., two sensors 28 disposed at axial position $X_1$, two sensors 28 disposed at axial position $X_2$, two sensors 28 disposed at axial position $X_3$, etc. The SONAR flow meter and respective sensor array configurations disclosed in U.S. Pat. Nos. 7,418,877; 7,603,916; and 9,068,872, and disclosed in U.S. Patent Publication No. 2021/0010841, each of which is hereby incorporated by reference in its entirety, are examples of SONAR flow meters 24, or devices that incorporate SONAR flow meters, and sensor arrays that may be used with the present disclosure.

Within the SONAR flow meter 24, the strain sensor array 26 is in communication with the sensor array processing unit 30. Signals ($P_1(t)$-$P_N(T)$) representative of the sensed strain are provided by the sensors 28 to the sensor array processing unit 30. The sensor array processing unit 30 may itself, or in combination with one or more other processors, process the sensor signals to determine a fluid flow parameter (e.g., convective velocity, gas flow rate, liquid flow rate, etc.) of the fluid passing within the flow tube. Using a sensor array 26 to determine a fluid flow parameter of a fluid flow passing within a flow tube is known, and the present disclosure is not limited to any particular device and/or methodology configured for the same. Acceptable devices and/or methodologies that may be used to determine certain fluid flow parameters (that may be used within the present disclosure) include, but are not limited to, those disclosed in U.S. Pat. Nos. 7,418,877; 7,603,916; and 9,068,872 (disclosed above), U.S. Pat. Nos. 7,389,187 and 7,793,555 (each hereby incorporated by reference in its entirety), U.S. Patent Publication No. 2021/0010841 (disclosed above), and U.S. patent application Ser. No. 17/322,377 (hereby incorporated by reference in its entirety). These devices/systems or the like may be modified according to aspects of the present disclosure.

The processing requirements of the present system 20 may be accomplished in several different configurations. For example, the SONAR flow meter 24 (including its processing unit 30) may be in communication with a system processing unit 32 that is in communication with the Coriolis flow meter 22, and in some embodiments with the DP meter 34; e.g., see FIG. 2. Alternatively, signals from the SONAR flow meter 24 components may be communicated to a Coriolis flow meter 22 component that accomplishes the system 20 functionality described herein. Still further, a system processing unit 32 may be configured to provide the processing requirements for the SONAR flow meter 24 and the Coriolis flow meter 22, and in some embodiments the DP meter 34; e.g., See FIG. 3. The present disclosure is not limited to any particular configuration. Any of these processing units may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 20 to accomplish the same algorithmically and/or coordination of system components. A processing unit may include a single memory device or a plurality of memory devices. The present disclosure is not limited to any particular type of non-transitory memory device, and may include read-only memory, random access memory, volatile memory, non-volatile memory, static memory, dynamic memory, flash memory, cache memory, and/or any device that stores digital information. A processing unit may include, or may be in communication with, an input device that enables a user to enter data and/or instructions, and may include, or be in communication with, an output device configured, for example to display information (e.g., a visual display or a printer), or to transfer data, etc. Communications between a processing unit and other system components may be via a hardwire connection or via a wireless connection.

Figure 4:
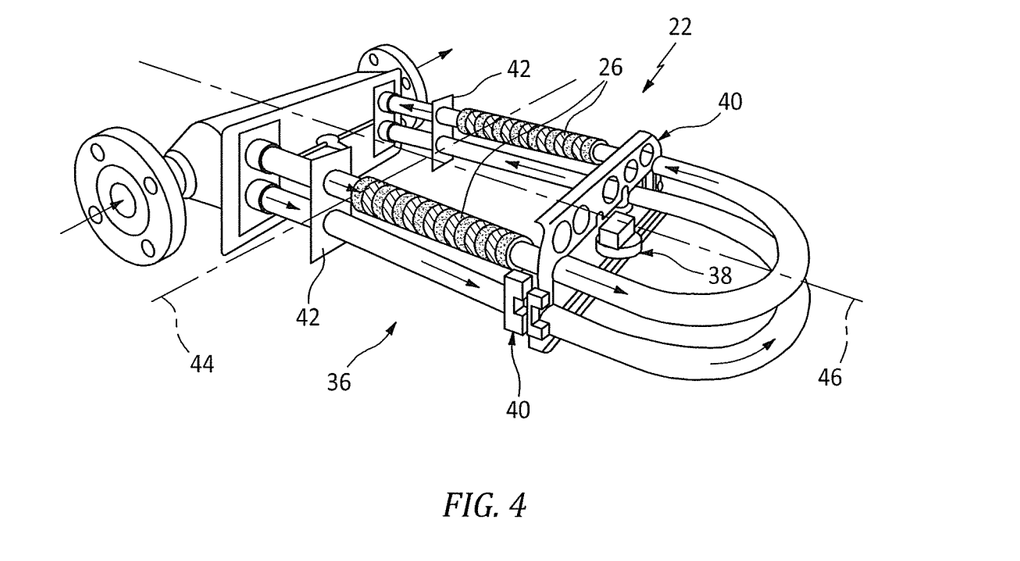
FIG. 4 is a perspective view of a dual, bent tube Coriolis flow meter with strain-based sensors disposed on a flow tube.

As indicated above, aspects of the present disclosure may be used with a Coriolis flow meter 22 or may be a system that includes a Coriolis flow meter 22. Coriolis flow meters are well-known and are available in a variety of different configurations; e.g., single or double bent tube Coriolis flow meters, straight tube Coriolis flow meters, etc. The present disclosure is not limited to any particular Coriolis flow meter 22 configuration. To facilitate the description herein, a non-limiting example of a dual bent tube Coriolis flow meter 22 is shown in FIG. 4 and described hereinafter. The Coriolis flow meter 22 includes a pair of bent flow tubes 36, an actuator (typically referred to as a "drive coil 38") and first and second motion sensors (typically referred to as a "pickoff coils 40"). The exemplary double tube Coriolis flow meter 22 shown in FIG. 4 further includes a pair of support flanges 42 that support the tubes 36 adjacent the pipe coupling portion of the Coriolis flow meter 22. The Coriolis flow meter 22 shown in FIG. 4 includes an array 26 of strain sensors 28, such as that described above, attached to both straight sections of a flow tube 36 of the Coriolis flow meter 22. Present disclosure embodiments may include a single array 26 of strain sensors 28 attached to a single straight section of a flow tube 36 of the Coriolis flow meter 22. The Coriolis flow meter 22 may be described as having an oscillating axis 44 located at the support flanges 42; i.e., the tubes 36 are cantilevered out from the support flanges 42 and may oscillate about the oscillating axis 44. The Coriolis flow meter 22 may also be described as having a twist axis 46 centrally located with respect to the flow tube 36 and generally perpendicular to the oscillating axis 44; i.e., the cantilevered tubes 36 may oscillate about the twist axis 46. During operation, the drive coil 38 is operated to drive a vibratory structural mode of the flow tubes 36 at resonance, and the pickoff coils 40 are configured to sense the motion of the respective tubes 36 and provide a signal representative of that motion. The Coriolis flow meter 22 measures the natural frequency of the flow tubes 36 to determine process fluid density and measures a phase lag associated with the twist of the tubes 36 to determine mass flow. The dominant structural vibration within the Coriolis flow tubes 36 is the intentionally driven vibration at a resonant frequency of flow tubes 36. The resonant frequency of the flow tubes 36 changes with operating conditions such as, but not limited to, any one of changes in process fluid density, the temperature of the flow tubes 36, fluid pressure within the flow tubes 36, or any combination thereof. The pickoff coils 40 sense the motion of the tubes 36 and provide signal feedback that may be used to maintain the tubes 36 at the resonant frequency. As stated above, the present disclosure is not limited to the exemplary double bent tube Coriolis flow meter 22 described above and shown within FIG. 4. Furthermore, Coriolis flow meters are well known in the art and therefore no further description is required herein to enable one skilled in the art.

Figure 5A:
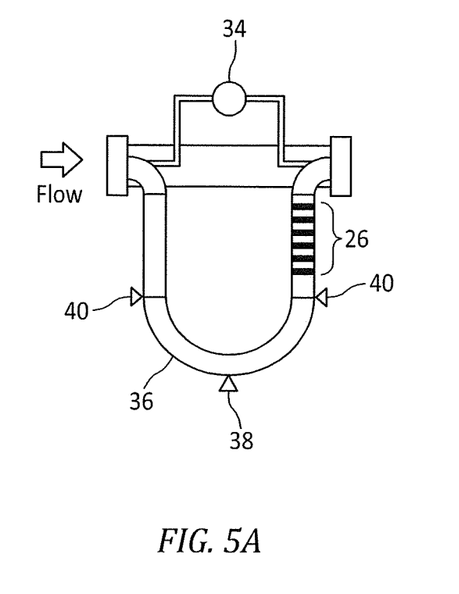
FIG. 5A is an exemplary schematic of a distributed and discrete DP plus SONAR augmented Coriolis flow meter embodiment.
Figure 5B:
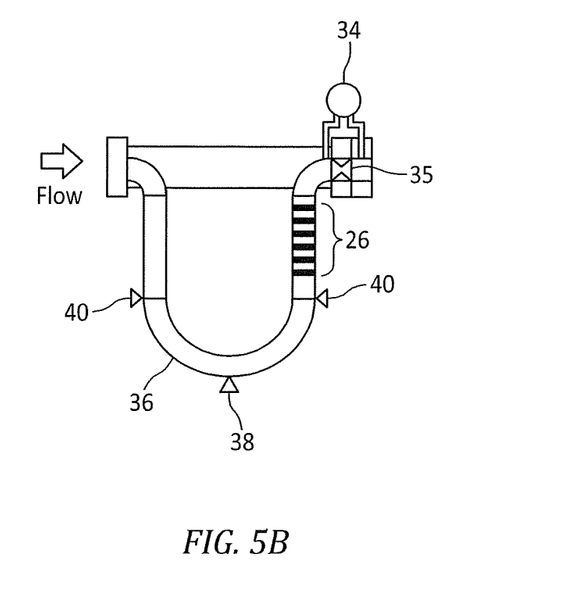
FIG. 5B is an exemplary schematic of a distributed and discrete DP plus SONAR augmented Coriolis flow meter embodiment.

The DP meter 34 may include any type of flow meter that enables flow measurement using a differential pressure ($\Delta P$) in the fluid flow. Non-limiting examples of a DP meter 34 that may be used include a venturi meter, pressure sensors, a diaphragm differential pressure meter, or the like. FIG. 5A diagrammatically illustrates a system embodiment having a DP meter that includes at least one first pressure probe disposed at or about the inlet of the tubes 36 and at least one second pressure probe disposed at or about the exit of the tubes 36. Signal data from the first and second pressure probes can be used to determine a differential pressure value across the Coriolis flow meter 22. In this configuration, the length over diameter (L/D) of the tubes and the friction coefficient produces a differential pressure value that is meaningful and can be used as described herein. FIG. 5B diagrammatically illustrates another system embodiment having a DP meter that includes an orifice (e.g., a venturi meter 35) disposed in or about the exit of the tubes 36. In this configuration, the venturi meter produces a differential pressure value that is meaningful and can be used as described herein. The present disclosure is not limited to these exemplary DP meters.

Embodiments of the present disclosure teaches a method and an apparatus that improves the performance of Coriolis flow meters on multiphase flows in general, and wet gas specifically.

Figure 6:
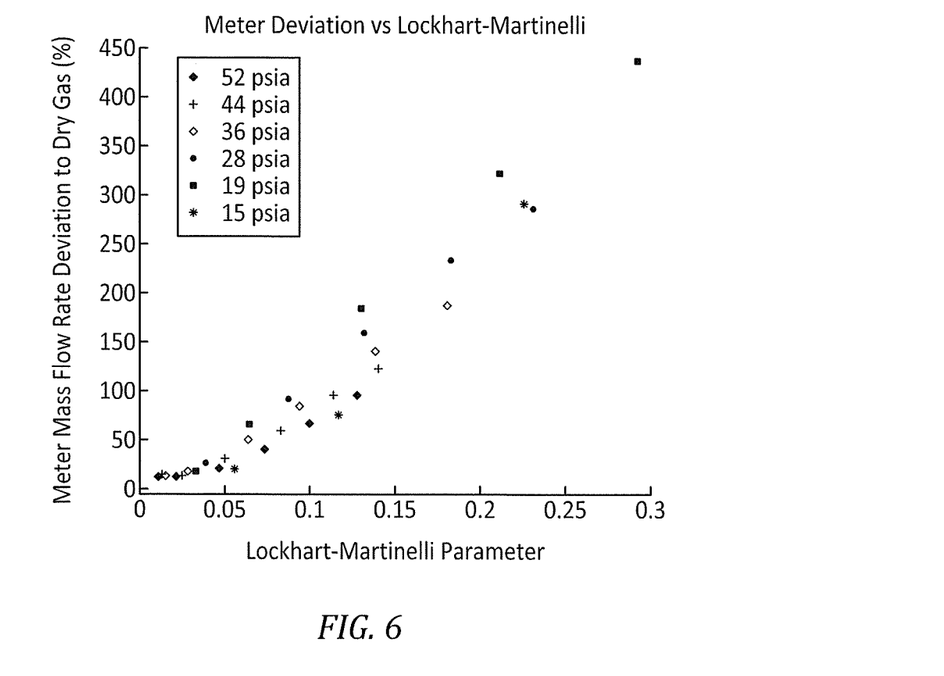
FIG. 6 is a graph of meter mass flow rate deviation to dry gas (%) vs Lockhart-Martinelli parameter, illustrating over-reading of gas rate for a Coriolis flow meter as a function of Lockhart-Martinelli parameter for several pressures (from Hollingsworth, 2019).

FIG. 6 shows the over-reading of gas rate for a Coriolis flow meter as a function of Lockhart-Martinelli Parameter for several pressures (from Hollingsworth, 2019). The Lockhart-Martinelli parameter is a measure of liquid loading in a wet gas flow and is defined as follows:

$$X_{LM} = \sqrt{\frac{\dot{m}_{gas} Q_{gas}}{\dot{m}_{liq} Q_{liq}}} = \sqrt{\frac{\rho_{gas}}{\rho_{liq}}} LGMR = \sqrt{\frac{\rho_{liq}}{\rho_{gas}} \frac{Q_{liq}}{Q_{gas}}} \approx \sqrt{\frac{\rho_{liq}}{\rho_{gas}}} LVF \quad \text{(Eqn. 1)}$$

where $X_{LM}$ is the Lockhart-Martinelli parameter, $\rho$ is density, $\dot{m}$ is the mass flow, Q is the volumetric flow, LGMR is the liquid to gas mass ratio, and LVF is the liquid volume fraction.

As shown in FIG. 6, the over-report associated with small Lockhart-Martinelli numbers is quite large, and, although somewhat correlated with Lockhart-Martinelli number, the over-report is highly variable with variation in process fluid conditions, such as process fluid pressure shown in FIG. 6.

For reference, the oil and gas industry consider various types of wet gas, classified by wetness levels. Type 1 wet gas flows have $X_{LM}$<0.02, type 2 have 0.02<$X_{LM}$<0.3, and type 3 wet gas flows have $X_{LM}$>0.3. FIG. 6 shows that dry gas mass flow error ranges from ~20% to 450% for type 2 wet gas flow.

Figure 7:
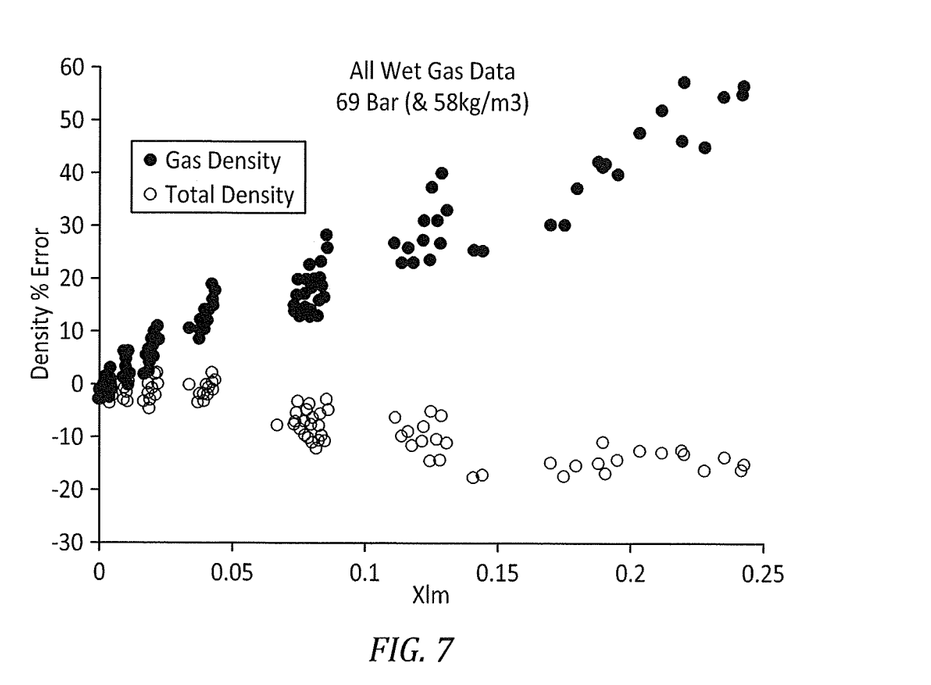
FIG. 7 is a graph of density % error versus Lockhart-Martinelli number, illustrating Coriolis density error measurement versus Lockhart-Martinelli number for wet gas flow (Stevens and Kinney, 2017).

FIG. 7 shows an example of the gas density and total density error reported by a Coriolis flow meter as a function of Lockhart-Martinelli number of a range of type 1 and type 2 wet gas flows.

As shown, the density reported by the Coriolis flow meter 22 is well correlated with both the actual gas density and the actual mixture density as a function of Lockhart-Martinelli number.

Figure 8:
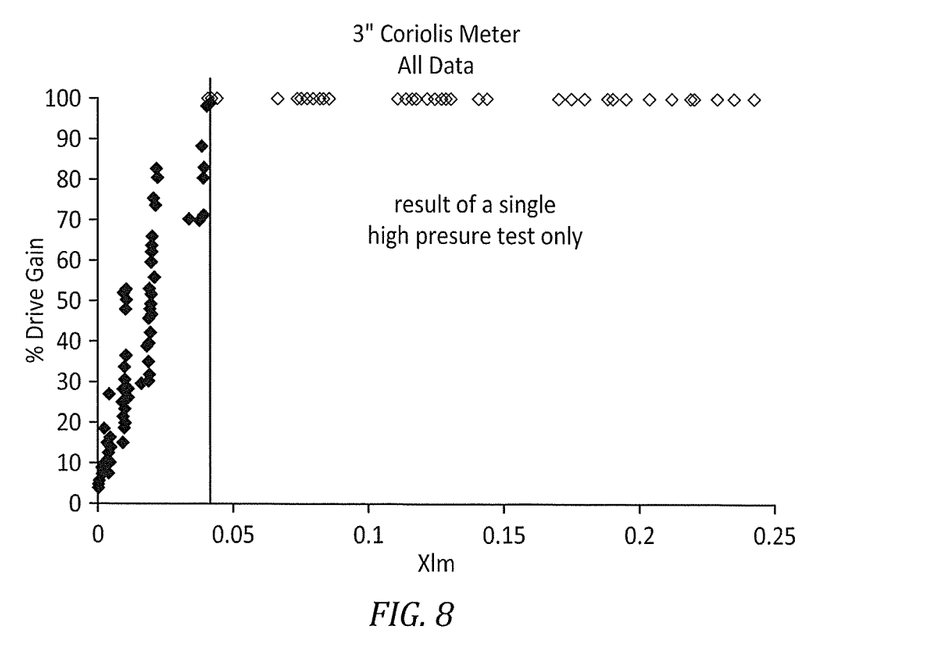
FIG. 8 is a graph of % drive gain versus Lockhart-Martinelli number, illustrating drive gain as a function of Lockhart-Martinelli Number for a Coriolis flow meter operating on wet gas (Stevens and Kinney, 2017).

The introduction of wetness to a gas typical increases the drive gain required to maintain a constant vibrational amplitude. This increase in drive gain can be used as an indicator of wetness. FIG. 8 shows drive gain as a function of Lockhart-Martinelli number for a Coriolis flow meter operating on wet gas (Stevens and Kinney, 2017).

Figure 9:
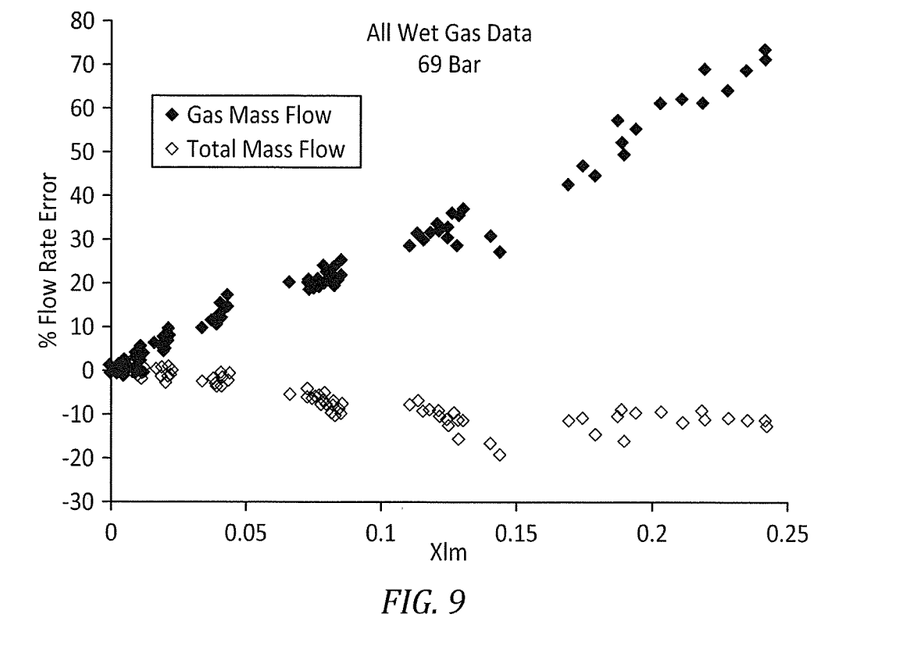
FIG. 9 is a graph of Coriolis gas mass flow and Coriolis total mass flow characteristics versus Lockhart-Martinelli parameter (Stevens and Kinney, 2017).

Based on the data presented above, it is clear that accurately interpreting the output of Coriolis flow meters operating on wet gas flows in terms of gas and liquid flow rates is a challenging proposition. Some authors have offered methods to correct the errors of Coriolis flow meters operating on wet gas based on correlations. FIG. 9 shows raw gas mass flow over-reading data and raw total mass flow over-reading data (negative in this case) as a function of Lockhart-Martinelli number from Stevens and Kinney 2017. As shown, the mass flow overreading is well correlated with the Lockhart-Martinelli number.

The present disclosure provides improved and unobvious alternative approaches to those known in the art. The over-reading due to wetness of differential pressure measurements had been studied for years and are, in general, well-understood over a wide range of flow conditions. Lansangan at al. (2008) presented work showing the benefits of installing an orifice plate at the inlet of a Coriolis flow meter 22 to measure the gas and liquid rates of wet gas flows. The over-reading characteristics due to wetness of volumetrically-based cross-correlation flow meters in general, and SONAR flow meters specifically, operating on wet gas flows are typically small compared to those observed on momentum-based flow meters (DP devices), or mass (Coriolis flow meters). Embodiments of the present disclosure teach the integration of a differential pressure based flow measurement and/or cross correlation flow measurement within the body of a Coriolis flow meter 22 to better address wet gas flow conditions. In addition, the present disclosure addresses wet gas measurements for which both the liquid and gas phase densities are known, and also cases for which only the gas phase density is known, and the liquid phase density is unknown.

Some embodiments of the current disclosure utilize the pressure drop across the flow tubes 36 of the Coriolis flow meter 22 as a measurement, combined with a convective flow velocity measurement taken on the flow tubes 36 of the Coriolis flow meter 22 to measure wet gas flows of sufficient wetness. The present disclosure utilizes a Coriolis mass flow and density to measure wet and dry gas flows. For dry gas flows and wet gas flows of sufficiently low wetness, the output of the Coriolis flow meter 22 is used to determine the mass and density of the process fluid. However, when the wetness, as indicated by the Coriolis drive gain and/or the difference between an expected and measured process fluid density, exceeds a threshold, the gas and liquid rates are determined by a combination of a differential pressure and a SONAR convective velocity measurement.

The present disclosure provides numerous benefits. Under sufficiently dry conditions, the Coriolis mass flow and density measurements can be used to both provide measurement as well as calibrate the dry gas differential pressure and SONAR flow meter 24 measurements. In some embodiments and as described herein, the existing flow tubes 36 may be used as a differential pressure device (e.g., see FIG. 5A) and as a flow conduit to install the SONAR velocity measurement (e.g., also shown in FIG. 5A). This system embodiment provides significantly improved wet gas capability without modifying the footprint or pressure drop characteristics of the existing Coriolis flow meter 22. The additional measurements can be integrated with the Coriolis flow meter 22, and an enclosure 48 around the flow tubes 36 of the Coriolis flow meter 22 provides protection for at least portions of the SONAR flow meter 24, providing additional synergies associated with the present disclosure.

The following exemplary analysis illustrates how a differential pressure measurement, and a convective velocity measurement may be utilized to quantify the gas and liquid rates of a wet gas flow.

The over-reading of a differential pressure device as a function of wetness can be expressed in many ways, an example of one way is given below:

$$DP_{meas} = K_{DP_{dry}} * \tfrac{1}{2} \rho_{gas} V_{gas}^2 (1 + \beta_{DP} X_{LM}) \quad \text{(Eqn. 2)}$$

where $DP_{meas}$=measured differential pressure, $K_{S_{dry}}$ is SONAR gas calibration constant, $K_{DP_{dry}}$ is DP gas calibration constant, $V_{gas}$=gas velocity; $\beta_{DP}$ is the DP wetness sensitivity constant, $\beta^S$ is the SONAR wetness sensitivity constant, and $X_{LM}$ is Lockhart-Martinelli number. The measured velocity ($V_{meas}$) may be expressed as:

$$V_{meas} = K_{S_{dry}} * V_{gas} (1 + \beta_S X_{LM}) \quad \text{(Eqn. 3)}$$

Assuming that the wetness sensitivity constants $\beta_{DP}$ and $\beta_S$ and the dry gas calibration constants $K_{DP_{dry}}$ and $K_{S_{dry}}$, are known, the gas and the liquid rates can be determined from the differential pressure and the SONAR measurement.

In some embodiments, a method for determining the gas and liquid rates from a differential pressure and the measured SONAR velocity includes defining an error function and adjusting the gas velocity and the Lockhart-Martinelli Number until the error function is minimized (e.g., below a predetermined value, etc.). A non-limiting example of such an error function is given below:

$$\text{Error} = \alpha_1 \left( \frac{DP_{meas} - K_{DP_{dry}} * \frac{1}{2}\rho_{gas} V_{gas}^2 (1 + \beta_{DP} X_{LM})}{DP_{meas} + K_{DP_{dry}} * \frac{1}{2}\rho_{gas} V_{gas}^2 (1 + \beta_{DP} X_{LM})} \right)^2 +$$
$$\alpha_2 \left( \frac{V_{meas} - K_{S_{dry}} * V_{gas}(1 + \beta_S X_{LM})}{V_{meas} - K_{S_{dry}} * V_{gas}(1 + \beta_S X_{LM})} \right)^2 \quad \text{(Eqn. 4)}$$

where $\alpha_1$, $\alpha_2$ are weighting factors.

The following is a representative example of a SONAR and differential pressure augmented Coriolis flow meter 22, for example using a Coriolis flow meter 22 with dual flow tubes 36, each tube six foot (6 ft) in length and having a 1.8 inch inner diameter. The differential pressure measurement (e.g., via DP meter 34) is taken across the length of the flow tubes 36. One of the Coriolis flow meter flow tubes 36 has an array 26 of strain-based pressure sensors 28 mounted thereon that are used to provide a SONAR-based convective velocity measurement.

Assuming a Darcy friction factor of 0.02, the dry gas differential pressure constant ($K_{DP_{dry}}$) can be estimated to be 0.83, and the dry gas differential pressure measurement ($\Delta P_{DryGas}$) may be determined as follows:

$$\Delta P_{DryGas} = K_{DP_{dry}} = \quad \text{(Eqn. 5)}$$
$$f\left(\frac{L}{D}\right)\left(\frac{1}{2}\rho_{gas} V_{gas}^2\right) = 0.02\left(\frac{72 \text{ in}}{1.8 \text{ in}}\right)\left(\frac{1}{2}\rho_{gas} V_{gas}^2\right) = 0.83\left(\frac{1}{2}\rho_{gas} V_{gas}^2\right)$$

Gysling et al., 2007, shows data from which the DP wetness sensitivity, $\beta_{DP}$, can be estimated to be:

$$\beta_{DP} \sim 1.0 * sqrt\left(\frac{\rho_{liq}}{\rho_{gas}}\right) \quad \text{(Eqn. 6)}$$

For this example, we assume $K_{S_{dry}}=0.83$, and the SONAR wetness sensitivity constant $\beta_S$ given by:

$$\beta_s \sim sqrt\left(\frac{\rho_{gas}}{\rho_{liq}}\right) \quad \text{(Eqn. 7)}$$

Figure 10:
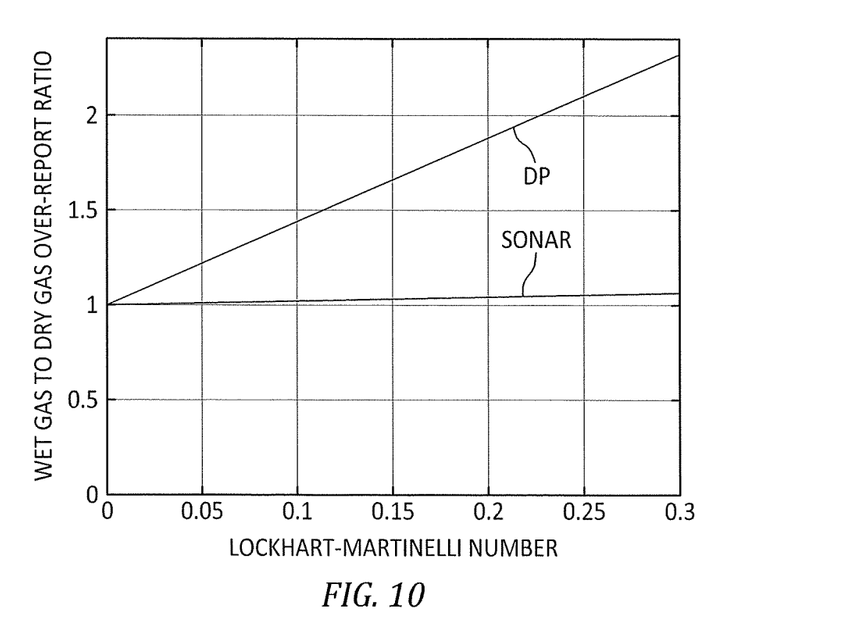
FIG. 10 is a graph of wet gas to dry gas over-report ratio versus Lockhart-Martinelli Number, illustrating an example of over-reading for differential pressure and SONAR versus Lockhart-Martinelli Number.

Using these values, the differential pressure and SONAR over-reading as a function of Lockhart-Martinelli is plotted in FIG. 10.

Figure 11:
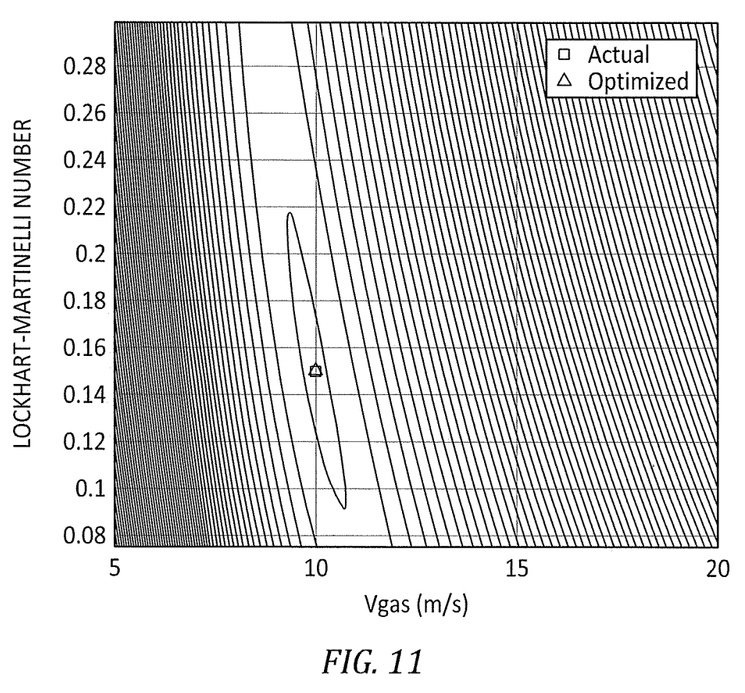
FIG. 11 is graph of Lockhart-Martinelli number versus gas velocity, illustrating an exemplary error function over a range of trial gas velocities and Lockhart-Martinelli numbers, showing the actual conditions, and simulated and the optimized values.

FIG. 11 shows the error function defined above, with $\alpha_1=1$ and $\alpha_2=1$, for an example case where simulated measured values of differential pressure (DP=0.12 psi) and SONAR velocity ($V_S=10.15$ m/s) where the simulated measured values are based on set-point conditions of $V_{gas}=10$ m/s at a Lockhart-Martinelli Number of $X_{LM}=0.15$.

As indicated in FIG. 11, the error function shows a well-defined, unique minimum at the set-point conditions showing that the measured differential pressure and SONAR velocity can be used to uniquely determine the gas and liquid rates flowing through the Coriolis flow meter 22.

FIGS. 5A and 5B show exemplary schematics of a distributed and discrete DP plus SONAR Augmented Coriolis flow meter 22. As shown the SONAR and differential pressure instrumentation is integrated within the footprint of the existing Coriolis flow meter 22. As described above, the control system (e.g., processing units, etc.) associated with the DP meter 34, the SONAR flow meter 24, and the Coriolis flow meter 22 may be independent of one another or may be partially or completely integrated into a single system.

Figure 12:
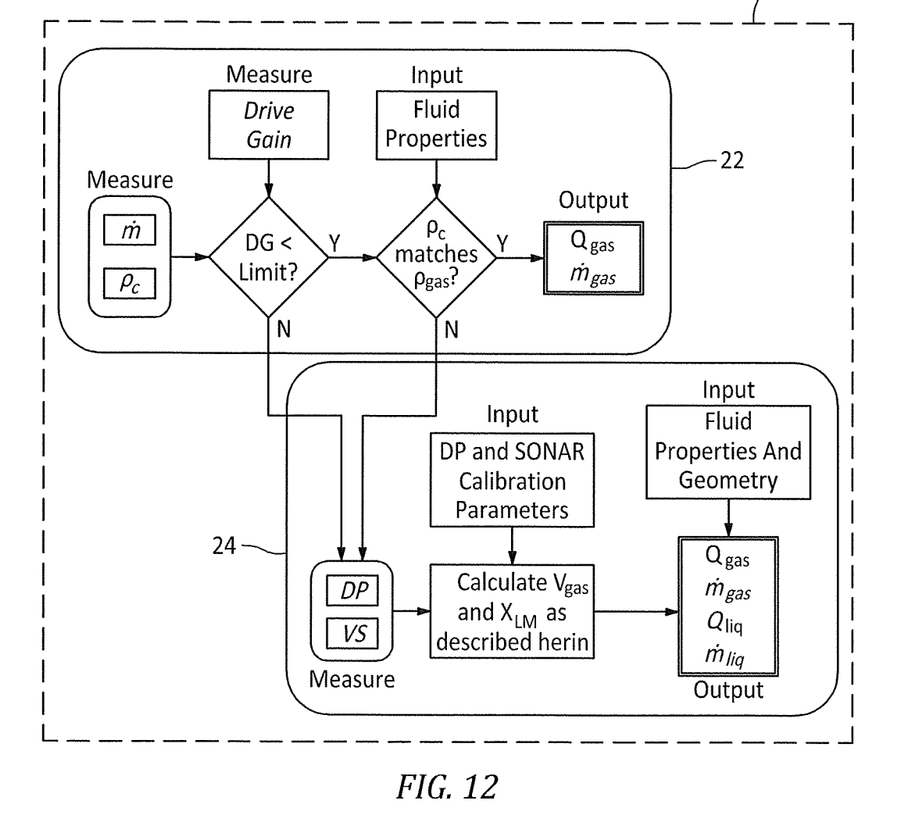
FIG. 12 is an exemplary schematic of an algorithm for a DP and SONAR augmented Coriolis flow meter embodiment for wet and dry gas.

FIG. 12 shows an exemplary schematic of an algorithm for DP and SONAR Augmented Coriolis flow meter 22 for wet and dry gas. In this embodiment, the Coriolis flow meter 22 may function as a standard Coriolis flow meter for conditions for which the drive gain is below a threshold value and the measured density matches the expected density sufficiently well. If either condition intended to indicate wetness is indicated, the meter may utilize a DP plus SONAR algorithm to determine the gas and liquid rates. It is noted that the specific wet gas indicators and DP plus SONAR algorithms may vary without changing the general approach of utilizing measured wet gas indicators to determine whether the reported measurement will utilize either measurements from the Coriolis measurements or the differential pressure and SONAR measurements. The present disclosure is not limited to any particular DP plus SONAR algorithm. Non-limiting acceptable examples of such algorithms that may be used are disclosed in U.S. Pat. Nos. 7,418,877; 7,603,916; and 9,068,872 (disclosed and incorporated by reference above). These algorithms may be modified according to aspects of the present disclosure.

Figure 13:
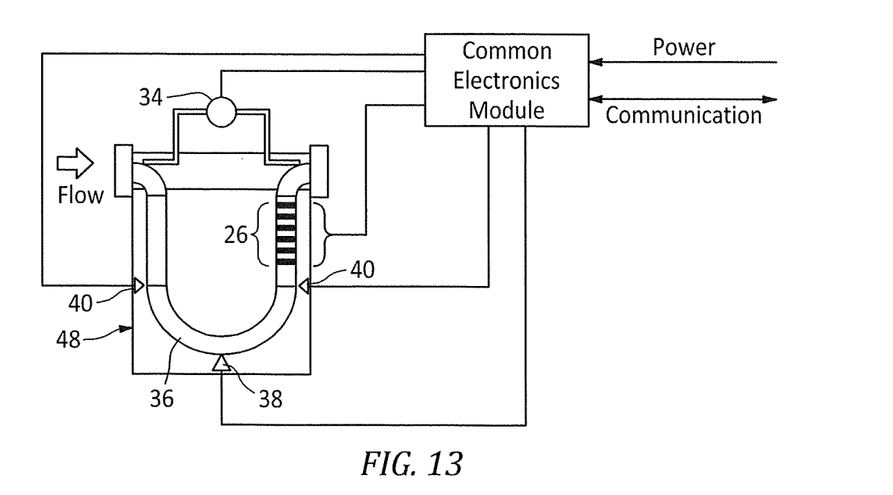
FIG. 13 is an exemplary schematic showing a present disclosure system embodiment having a common enclosure and a common electronics module.

FIG. 13 shows an exemplary schematic showing common enclosure (which may be sealed) and common electronics module for a differential pressure and SONAR augmented Coriolis flow meter 22. Utilizing common infrastructure (as described above) for the combination of the measurements greatly reduces the cost of implementing this functionality with separate devices. Embodiments of the present disclosure provide significantly enhanced wet gas capability with a device that has the same form and fit of a standard Coriolis flow meter.

Figure 14:
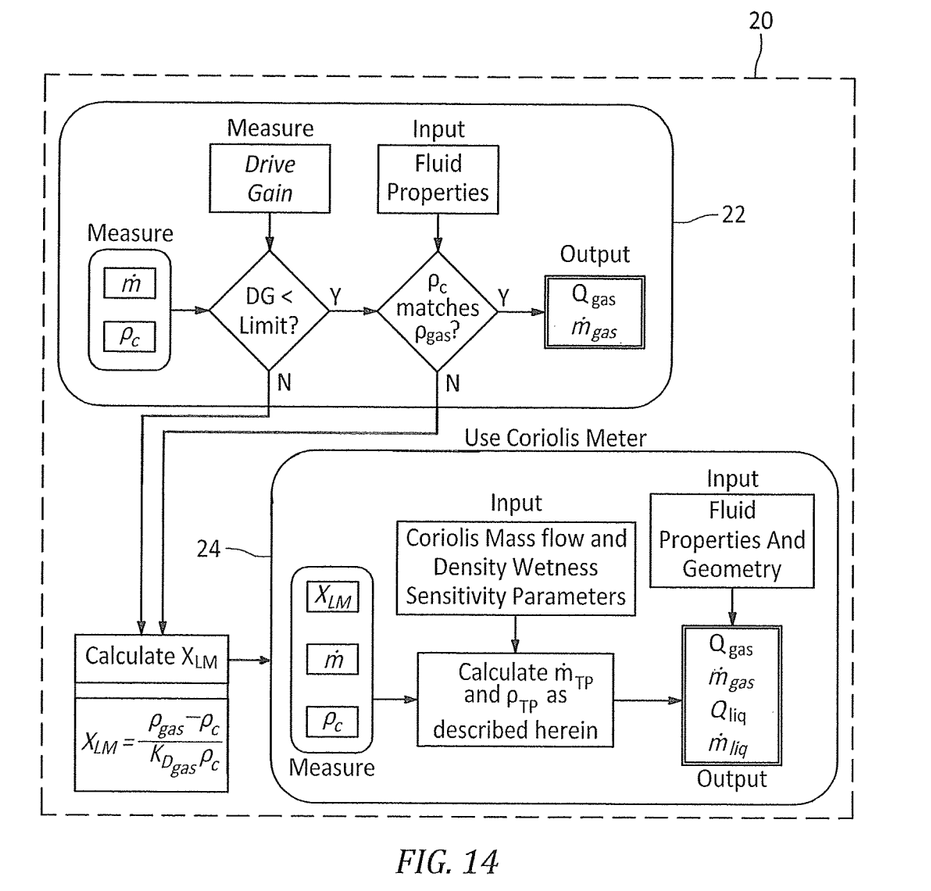
FIG. 14 is an exemplary schematic of an interpretation algorithm for a wet gas Coriolis flow meter embodiment.

FIG. 14 shows an exemplary schematic of an interpretation algorithm for a wet gas Coriolis flow meter 22. In this embodiment, the Coriolis flow meter 22 measures the mass flow (m) and density (ρ) of a dry or wet gas mixture. The drive gain is compared to a threshold value and the measured density is compared to the expected dry gas density. Pressure, temperature, and gas composition values are used within an equation of state (EOS) model to determine the expected gas density. If the measured density is larger than the expected density, a wetness-based dry gas over-reading correlation may be used. In this embodiment, the dry gas over-report may be assumed to be a linear function of Lockhart-Martinelli number $$\rho_c = \rho_{gas}(1+\beta_{CGD} X_{LM}) \quad \text{(Eqn. 8)}$$

where $\rho_c$ is the density reported by the Coriolis flow meter 22, and $\beta_{CGD}$ is the Coriolis gas density wetness sensitivity parameter. Assuming the Coriolis gas density wetness sensitivity parameter ($\beta_{CGD}$) and the dry gas density ($\rho_{gas}$) are known, the Lockhart-Martinelli number may be given by:

$$X_{LM} = \frac{\rho_c - \rho_{gas}}{\beta_{CGD} \rho_{gas}} \quad \text{(Eqn. 9)}$$

With the wetness determined, and assuming that the over-report of the Coriolis mass flow meter correlates with wetness, the mass flow can be determined. In this embodiment, the mass flow of the gas ($\dot{m}_{gas}$) may be assumed to be related to the measured mass flow from the Coriolis flow meter 22 ($\dot{m}_c$), the wetness sensitivity parameter ($\beta_{CGM}$), and the Lockhart-Martinelli parameter ($X_{LM}$), as follows:

$$\dot{m}_c = \dot{m}_{gas}(1 + \beta_{CGM} X_{LM})$$ (Eqn. 10)

Accordingly, the mass flow of the dry gas may be given by:

$$\dot{m}_{gas} = \frac{\dot{m}_c}{(1 + \beta_{CGM} X_{LM})}$$ (Eqn. 11)

Following the definition of the Lockhart-Martinelli parameter, for cases in which the liquid phase density is sufficiently well known, the mass flow of the liquid ($\dot{m}_{liq}$) may be given by:

$$\dot{m}_{liq} = \sqrt{\frac{\rho_{liq}}{\rho_{gas}}} X_{LM} \dot{m}_{gas}$$ (Eqn. 12)

While the wet gas Coriolis flow meter 22 embodiments described above are attractive from a simplicity perspective, the wet gas over-reading characteristics of SONAR flow meters and/or DP meters are more closely linked to first principle physics than the mass flow over-report characteristics of a Coriolis flow meter.

Adding a differential pressure device (e.g., a DP meter 34) to a Coriolis flow meter provides an alternative approach to measuring wet gas. FIGS. 5A and 5B show exemplary schematics of two differential pressure augmented Coriolis flow meters 22.

Using the Coriolis flow meter density and a known dry gas density to determine the wetness in general, and Lockhart-Martinelli parameter specifically in this embodiment, the dry gas velocity can be related to the differential pressure ($DP_{meas}$), the DP gas calibration constant ($K_{DPdry}$), the dry gas density ($\rho_{gas}$), the previously determined Lockhart-Martinelli number ($X_{LM}$), and the DP wetness sensitivity constant ($\beta_{DP}$), as follows:

$$V_{gas} = \sqrt{\frac{2 DP_{meas}}{K_{DP_{dry}} \rho_{gas}(1 + \beta_{DP} X_{LM})}}$$ (Eqn. 13)

The gas mass flow may be given by:

$$\dot{m}_{gas} = \rho_{gas} V_{gas} A$$ (Eqn. 14)

where "A" is the cross-sectional area of the fluid conveying conduit (i.e., flow tube 36). Similarly, the liquid mass flow may be related to the determined gas mass flow ($\dot{m}_{gas}$), the determined Lockhart-Martinelli number ($X_{LM}$), and the known densities of the gas and liquid phases ($\rho_{gas}$, $\rho_{liquid}$), as follows:

$$\dot{m}_{liq} = \sqrt{\frac{\rho_{liq}}{\rho_{gas}}} X_{LM} \dot{m}_{gas}$$ (Eqn. 15)

Figure 15:
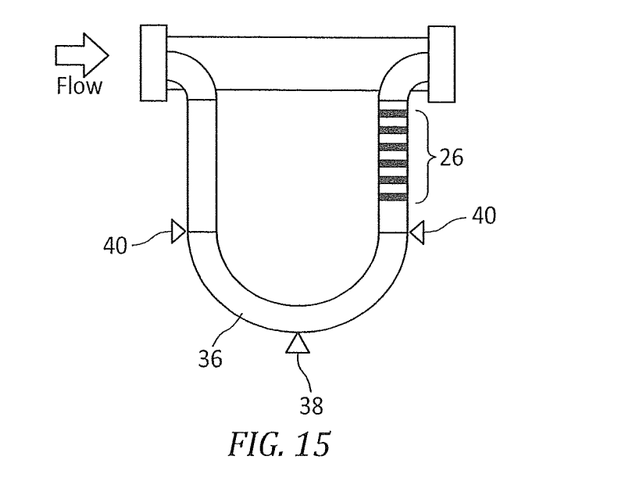
FIG. 15 is an exemplary schematic showing a present disclosure system embodiment having a SONAR augmented Coriolis flow meter.

FIG. 15 shows an exemplary convective velocity augmented Coriolis flow meter 22. A SONAR-augmented Coriolis flow meter 22 is well-suited to measure wet gas utilizing the Coriolis density measurement and knowledge of the dry gas density to determine wetness and then utilizing the wetness measurement and the convective velocity measurement to measure the gas and liquid rates. It should be noted that the method described herein could be implemented with the SONAR flow meter 24 integrated within the Coriolis flow meter 22 described herein, or the SONAR measurement could be measured on piping in close fluid communication with the Coriolis flow meter 22.

The gas rate can be determined from the measured SONAR velocity ($V_{meas}$), the SONAR gas calibration constant ($K_{Sdry}$), the measured wetness parameter ($\beta_S$), and the Lockhart-Martinelli number ($X_{LM}$), using a wetness sensitivity model. For this embodiment, the following model may be used:

$$V_{gas} = \frac{V_{meas}}{K_{S_{dry}} * (1 + \beta_S X_{LM})}$$ (Eqn. 16)

The gas mass flow may be given by:

$$\dot{m}_{gas} = \rho_{gas} V_{gas} A$$ (Eqn. 17)

And, similarly, the liquid mass flow may be given by:

$$\dot{m}_{liq} = \sqrt{\frac{\rho_{liq}}{\rho_{gas}}} X_{LM} \dot{m}_{gas}$$ (Eqn. 18)

As indicated above, the present disclosure includes several methodology embodiments that utilize combinations of Coriolis flow meter 22, differential pressures, and cross correlation velocity measurements and correlations of their respective over-reading characteristics to determine the gas and liquid mass flow rates of wet gas mixtures.

In many situations involving wells producing hydrocarbon mixtures of gas, hydrocarbon condensates, and water, the ratio of produced condensate to produced gas is known based on knowledge of the compositional properties of the reservoir. Often in these cases, the operator of the well seeks a measure of the produced water. In these situations, a measure of gas mass flow and the liquid mass flow can be used to determine a produced gas to liquid ratio and this can be compared to an expected gas and condensate ratio (from for example, known compositional analysis of a reservoir) and any excess liquid mass flow can be assumed to be produced water.

Additionally, often the density of the liquid phase of mixture of gases and liquids is sought as a measured parameter. Knowing the density of produced liquids, for example, can provide a means to determine produced water cut if the density of the produced hydrocarbon liquid and the density of the produced water is known.

The present disclosure provides a method to determine the density of the liquid phase within a wet gas mixture by utilizing the Coriolis total mass flow characteristic shown in FIGS. 7 and 9.

The following is an example of how a fluid flow liquid density may be determined using only a Coriolis flow meter 22. With the gas density known, the measured Coriolis density can be used with a wetness sensitivity correlation to determine a measure of wetness as described above.

$$\rho_c = \rho_{gas}(1 + \beta_{CGD} X_{LM})$$ (Eqn. 8)

Accordingly, the Lockhart-Martinelli number can be expressed as:

$$X_{LM} = \frac{\rho_c - \rho_{gas}}{\beta_{CGD}\rho_{gas}} \quad \text{(Eqn. 9)}$$

Then, utilizing a correlation between the measured Coriolis mass flow, the gas mass flow, the determined wetness parameter, and the Lockhart-Martinelli number, the mass flow of the gas can be determined, also as developed above.

$$\dot{m}_c = \dot{m}_{gas}(1+\beta_{CGM}X_{LM}) \quad \text{(Eqn. 10)}$$

Accordingly, the mass flow of the dry gas is given by:

$$\dot{m}_{gas} = \frac{m_c}{(1+\beta_{CGM}X_{LM})} \quad \text{(Eqn. 11)}$$

In addition, utilizing a correlation between the measured Coriolis mass flow and the total mass flow rate of a wet gas mixture, the total mass flow of the mixture may be determined as follows:

$$\dot{m}_e = \dot{m}_{total}(1+\beta_{CMT}X_{LM}) \quad \text{(Eqn. 19)}$$

The liquid mass flow rate may then be expressed as follows:

$$\dot{m}_{total} = \frac{\dot{m}_c}{(1+\beta_{CMT}X_{LM})} = \dot{m}_{gas} + \dot{m}_{liq} \quad \text{(Eqn. 20)}$$

$$\dot{m}_{total} = \dot{m}_{gas} + \dot{m}_{liq} \quad \text{(Eqn. 21)}$$

$$\dot{m}_{liq} = \dot{m}_{total} - \dot{m}_{gas} \quad \text{(Eqn. 22)}$$

$$\dot{m}_{liquid} = \frac{\dot{m}_c}{(1+\beta_{CMT}X_{LM})} - \frac{\dot{m}_c}{(1+\beta_{CGM}X_{LM})} \quad \text{(Eqn. 23)}$$

(See Eqns. 11 and 20) Once the liquid mass flow rate is determined, the liquid density may be expressed using the other measured parameters and the definition of the Lockhart-Martinelli parameter.

$$\rho_{liq} = \rho_{gas}\left(\frac{\dot{m}_{gas}}{\dot{m}_{liq}X_{LM}}\right)^2 \quad \text{(Eqn. 24)}$$

The following is an example of how a liquid density value may be determined using only a DP augmented Coriolis flow meter 22. Assuming that the mass flow measured by a Coriolis flow meter operating in wet gas can be expressed in terms of the actual total mass flow of the wet gas mixture as a function of the Lockhart-Martinelli number and a Coriolis total mass flow wetness sensitivity parameter ($\beta_{CMT}$) as follows:

$$\dot{m}_c = \dot{m}_{total}(1+\beta_{CMT}X_{LM}) \quad \text{(Eqn. 19)}$$

$$\dot{m}_{total} = \frac{m_c}{(1+\beta_{CMT}X_{LM})} = \dot{m}_{gas} + \dot{m}_{liq} \quad \text{(Eqn. 20)}$$

The liquid mass flow rate may be determined using a measure of gas mass rate. As an example, using a differential pressure augmented Coriolis flow meter 22, the gas mas flow rate may be expressed as follows:

$$V_{gas} = \sqrt{\frac{2DP_{meas}}{K_{DP_{dry}}\rho_{gas}(1+\beta_{DP}X_{LM})}} \quad \text{(Eqn. 13)}$$

The gas mass flow is given by:

$$\dot{m}_{gas} = \rho_{gas}V_{gas}A = \rho_{gas}A\sqrt{\frac{2DP_{meas}}{K_{DP_{dry}}\rho_{gas}(1+\beta_{DP}X_{LM})}} \quad \text{(Eqn. 25)}$$

The following expression may be used to determine the liquid mass flow rate:

$$\dot{m} = \frac{m_c}{(1+\beta_{CMT}X_{LM})} - \rho_{gas}A\sqrt{\frac{2DP_{meas}}{K_{DP_{dry}}\rho_{gas}(1+\beta_{DP}X_{LM})}} \quad \text{(Eqn. 26)}$$

With the mass flow of the liquid, the mass flow of the gas, and the Lockhart-Martinelli number determined, and the gas density known, the definition of the Lockhart-Martinelli number may be used to determine the liquid density:

$$\rho_{liq} = \rho_{gas}\left(\frac{\dot{m}_{gas}}{\dot{m}_{liq}X_{LM}}\right)^2 \quad \text{(Eqn. 27)}$$

As indicated above, the correlation to determine the total mass flow of a wet gas mixture based on the wetness sensitivity of a Coriolis mass flow measurement, when used in conjunction with the methods disclosed herein to determine a total gas mass flow rate, provides a means to determine the total liquid flow rate. The total liquid flow rate and other measured parameters of the flow as described above, in turn, enable a determination of the density of the liquid phase.

Furthermore, it is disclosed herein that these methods can be used concurrently to provide measurements for which an optimized measurement is output. For example, a DP augmented Coriolis flow meter 22 may utilize both the methods described above and average the output from each method to provide an optimized measurement with contributions from each approach. Also, the weighting of measurement results from multiple methods can be adjusted based on flow diagnostic information, such as drive gain etc.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements are described as individual units and shown as independent of one another to facilitate the description. In alternative embodiments, such elements may be configured as combined elements.

Additionally, even though some features, concepts, or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated. Still further, the Detailed Description provided above includes various equations that illustrate the relationship between the various parameters. These equations are provided as examples of such relationships, and the present disclosure is not limited to these specific expressions.

Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

The invention claimed is:

1. An apparatus, comprising:
   a Coriolis flow meter having one or more flow tubes, the Coriolis flow meter configured to determine a density of a wet gas fluid flow passing through the one or more flow tubes;
   a SONAR flow meter having an array of sensors disposed on at least one of the one or more flow tubes;
   a first pressure probe and a second pressure probe, the probes spaced apart from one another and configured to collectively determine a measurement of differential pressure of the wet gas fluid flow within at least one of the flow tubes between the probes; and
   a processing unit in communication with Coriolis flow meter and the SONAR flow meter, and a non-transitory memory storing instructions, which instructions when executed cause the processing unit to:
      measure a density of the wet gas fluid flow passing within the one or more fluid flow tubes of the Coriolis flow meter using the Coriolis flow meter;
      determine an expected density of the multi-phase fluid flow using a measured pressure value of the fluid flow and/or a measured temperature value of the fluid flow, and an equation of state model;
      determine a mass flow rate of a constituent within the wet gas fluid flow using the Coriolis flow meter measured fluid flow density when the Coriolis flow meter measured fluid flow density is within a predetermined range of the expected density of the fluid flow and a drive gain value of the Coriolis flow meter is below a threshold drive gain value; and
      determine the mass flow rate of the constituent within the wet gas fluid flow using the measurement of differential pressure and the SONAR flow meter when the Coriolis flow meter measured fluid flow density is outside of the predetermined range of the expected density of the fluid flow and the drive gain value of the Coriolis flow meter is above the threshold drive gain value.

2. The apparatus of claim 1, wherein the determined mass flow rate of the constituent within the wet gas fluid flow is a gas constituent.

3. The apparatus of claim 2, wherein the determined mass flow rate of the constituent within the wet gas fluid flow is a liquid constituent.

4. The apparatus of claim 1, wherein the the first pressure probe is disposed at an inlet of the at least one of the one or more flow tubes and the second pressure probe is disposed at an exit of the at least one of the one or more flow tubes.

5. The apparatus of claim 1, wherein the first pressure probe and the second pressure probe are disposed at an exit of the at least one of the one or more flow tubes spaced apart from one another.

6. The apparatus of claim 5, wherein a flow orifice is disposed within the at least one of the one or more flow tubes between the first pressure probe and the second pressure probe.

7. A method of determining a mass flow rate of a constituent within a wet gas fluid flow, comprising:
   providing a Coriolis flow meter having a flow tube, the Coriolis flow meter having a drive gain value during operation;
   providing a SONAR flow meter having an array of sensors installed on the flow tube, the sensors configured to determine a convective velocity value of the wet gas fluid flow passing through the flow tube;
   using the Coriolis flow meter to a determine a measured density of the wet gas fluid flow passing through the flow tube;
   determining an expected density of the wet gas fluid flow using a measured pressure value and/or a measured temperature value of the fluid flow and an Equation of State model; and
   determining the mass flow rate of the constituent within the wet gas fluid flow using the Coriolis flow meter measured fluid flow density when the Coriolis flow meter measured fluid flow density is within a predetermined range of the expected density of the fluid flow and a drive gain value of the Coriolis flow meter is below a threshold drive gain value; and
   determining the mass flow rate of the constituent within the wet gas fluid flow using a measurement of differential pressure of the wet gas fluid flow within at least one of the flow tubes between a first pressure probe and a second pressure probe, the probes spaced apart from one another, and the SONAR flow meter when the Coriolis flow meter measured fluid flow density is outside of the predetermined range of the expected density of the fluid flow and the drive gain value of the Coriolis flow meter is above the threshold drive gain value.

8. The method of claim 7, wherein the determined mass flow rate of the constituent within the wet gas fluid flow is a gas constituent.

9. The method of claim 7, wherein the determined mass flow rate of the constituent within the wet gas fluid flow is a liquid constituent.

10. The method of claim 9, further comprising determining a velocity of a gas constituent within the wet gas fluid flow using the SONAR flow meter to determine a convective velocity measurement and a SONAR gas calibration constant.

11. The method of claim 10, wherein the determination of the velocity of the gas constituent within the wet gas fluid flow uses a Lockhart-Martinelli value.

12. The method of claim 10, wherein the determination of the velocity of the gas constituent within the wet gas fluid flow uses a wetness sensitivity constant for the SONAR flow meter.

13. The method of claim 7, wherein the first pressure probe is disposed at an inlet of the flow tube and the second pressure probe is disposed at an exit of the flow tube.

14. The method of claim 7, wherein the first pressure probe and the second pressure probe are disposed at an exit of the flow tube spaced apart from one another.

15. The method of claim 14, wherein a flow orifice is disposed within the flow tube between the first pressure probe and the second pressure probe.

\* \* \* \* \*